July 7, 1925.
A. E. CALDWELL
1,545,233
WHEEL POSITION GAUGE AND INDICATOR FOR MOTOR VEHICLES
Filed Oct. 21, 1924
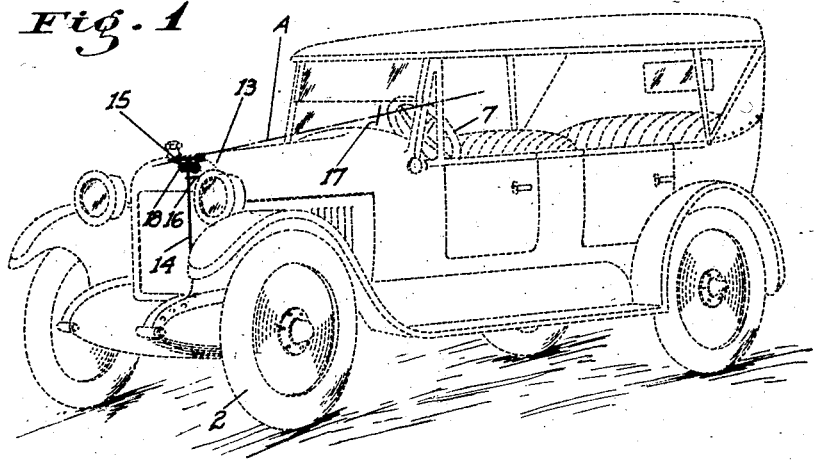
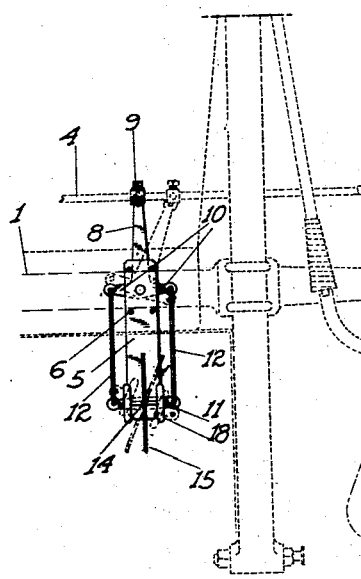
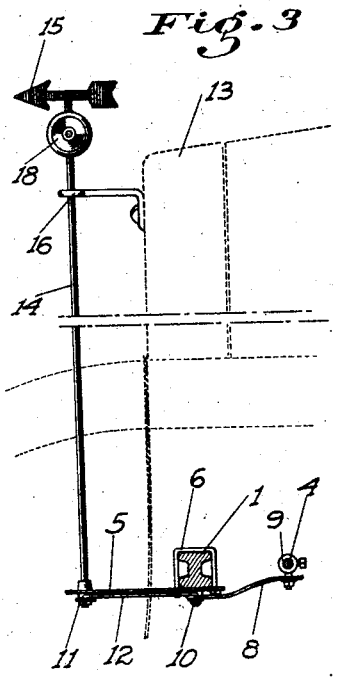
INVENTOR
*Archie E. Caldwell*
BY *Perry S. Webster*
ATTORNEY Patented July 7, 1925.

1,545,233

UNITED STATES PATENT OFFICE.

ARCHIE E. CALDWELL, OF COLUMBIA, CALIFORNIA.

WHEEL POSITION GAUGE AND INDICATOR FOR MOTOR VEHICLES.

Application filed October 21, 1924. Serial No. 744,901.

*To all whom it may concern:*

Be it known that I, ARCHIE E. CALDWELL, a citizen of the United States, residing at Columbia, county of Tuolumne, State of California, have invented certain new and useful Improvements in Wheel Position Gauges and Indicators for Motor Vehicles; and I do declare the following to be a full, clear, and exact description of same, reference being had to the accompanying drawings and to the characters of reference marked thereon, which form a part of this application.

This invention relates to attachments for motor vehicles of all kinds. In nearly all motor vehicles, the wheels are covered by mud guards or fenders, effectually preventing the driver from seeing the wheel if he maintains his normal position, and he cannot therefore be sure as to the relative positions of his front wheels.

The principal object of my invention therefore is to provide a device, readily and quickly attachable to a motor vehicle, by means of which the driver, from his seat, will know whether the front or steering wheels of the vehicle are in direct fore and aft alinement or not, and will also know exactly to what extent or angle the wheels are turned out of said direct alinement.

My device by thus notifying a driver as to the position of his steering wheels, will therefore be of valuable assistance to his driving or manipulation of the vehicle at various times, particularly when backing out along a narrow driveway, parking at close quarters to other vehicles or getting out from such positions, groping one's way along a road in a heavy fog, and in fact in any circumstances where knowledge of the relative straightness of alinement of the front wheels of the car will aid in handling the same.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective outline of an automobile showing my indicator thereon in its normal position.

Fig. 2 is a fragmentary top plan outline of the front portion of the automobile showing my device applied thereto.

Fig. 3 is a side view of the device showing the parts of the vehicle to which it is connected.

Referring now more particularly to the characters of reference on the drawings, the numeral 1 denotes the front axle of the automobile supporting the usual steerable wheels 2, the latter having rearwardly extending steering arms 3 mounted in connection therewith, said arms being coupled together by the usual cross rod 4. These parts are standard and in connecting my device thereto I do not have to make any changes or alterations of any kind thereto.

My attachment comprises a horizontal support or bracket 5 extending longitudinally of the car and ahead of the axle a certain distance. This bracket is preferably strapped on to the axle by U-bolts 6 or the like. This support is preferably disposed transversely on the axle so as to be in longitudinal alinement with the axis of the steering wheel 7 of the car.

Pivoted on this bracket towards its rear end is an arm 8 extending rearwardly to a pivotal connection with a collar 9 fixed on the rod 4. This arm 8 is the same operative length as the arm 3, and when installing the device the collar 9 is so secured on the rod relative to the position of the arms 3 as to be parallel to the latter.

A horizontal cross arm 10 is mounted in connection with the arm 8 and projects an equal extent on both sides of the same and at right angles thereto. A symmetrical and similarly disposed arm 11 is pivoted on the bracket 5 at the forward end of the latter, the outer corresponding ends of said arms 10 and 11 being connected by light wires or rods 12. Mounted pivotally with the arm 11 and projecting upwardly therefrom to a point a certain distance about the radiator 13 of the car is a rod 14 on whose upper end is a longitudinally extending indicator, such as an arrow 15, which is disposed so as to be parallel to the arm 8. A guide means 16 is provided for the rod intermediate its ends, said guide being connected to the radiator or adjacent part. This enables the rod to have the necessary vertical movement as the axle moves relative to the body of the car with the flexing of the springs, without interfering with the turning of said rod, as the arm 11 turns with the turning of the members 8 and 10.

The indicator 15 is preferably disposed so as to be in the direct line of vision of the driver seated behind the steering wheel 7, as indicated at A in Fig. 1. Said indicator when pointing straight ahead is also in line with a mark 17 on the wind shield, which mark is in longitudinal alinement with the axis of the steering wheel.

Also mounted on the rod 14 a suitable distance from the indicator 15 are a pair of miniature wheels 18 disposed so as to be parallel to the actual wheels 2.

By reason of the above described arrangement of parts it will be seen that since the arm 8 is the same length as the arm 3, said arms will have the same travel with the steering of the wheels. Also the rod 14 being operatively connected to the arm 10, as above described, will turn with the turning of said wheels, through the same arc as that of the steering spindles of the wheels 2, as will be evident.

Therefore the indicator 15 and wheels 18 will assume the same angle relative to the longitudinal axis of the car, as that assumed by the wheels 2 at any time. Thus the driver will be accurately advised at all times as to the relative position of his front wheels without actually seeing the same. The length of the bracket 5 is such as to enable the rod 14 which is located at the front end thereof, to be a suitable distance ahead of the radiator.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A wheel position indicator for a motor vehicle, such vehicle having steerable wheels, steering arms mounted in connection therewith and a transverse rod connecting said arms; comprising a vertical and turnable rod adapted to be supported from the front axle of the vehicle, a longitudinally extending indicator on the rod disposed parallel to the wheels, an arm pivoted at one end with respect to the axle and adapted to be connected at the other end to the steering-arm rod; said last named arm being the same operative length as the steering arm and parallel thereto, whereby said arms will turn through the same arc with the steering of the wheels, and connecting means between said arm and the indicator rod to cause the indicator to turn in the same direction as the wheels and to the same arcuate extent.

2. A wheel position indicator for a motor vehicle, such vehicle having steerable wheels, steering arms mounted in connection therewith and a transverse rod connecting said arms; comprising a bracket adapted to be clamped onto and projecting ahead of the front axle of the vehicle, a vertical rod having an indicator at its upper end turnably mounted on the bracket adjacent its forward end, an arm pivoted on the bracket adjacent its rear end and adapted to be connected at its free end to the steering-arm rod; said first named arm and the steering arm being parallel to each other, an arm fixed on the indicator rod and extending transversely of the bracket, a similar and parallel arm projecting from the first named arm, and a connection between said transverse arms.

3. A wheel position indicator for a motor vehicle, such vehicle having steerable wheels and connecting means therebetween including a vertical and turnable rod adapted to be supported from the vehicle and having a longitudinally extending indicator disposed parallel to the wheels, and means between the indicator rod and the wheel connecting means to cause the indicator to turn through the same angle as the wheels while allowing said indicator rod to be disposed at any distance ahead of the axle of the wheels.

In testimony whereof I affix my signature.

ARCHIE E. CALDWELL.